United States Patent
Komatsubara et al.

(10) Patent No.: US 8,414,054 B2
(45) Date of Patent: Apr. 9, 2013

(54) TILT-MECHANISM-INTEGRATED SUSPENSION MECHANISM

(75) Inventors: Takao Komatsubara, Kurashiki (JP); Tomohiro Gohara, Kurashiki (JP); Akira Kuroki, Kurashiki (JP)

(73) Assignee: Namba Press Works Co., Ltd., Okayama (JP)

( * ) Notice: Subject to any disclaimer, the term of this patent is extended or adjusted under 35 U.S.C. 154(b) by 0 days.

(21) Appl. No.: 12/739,263

(22) PCT Filed: Oct. 17, 2008

(86) PCT No.: PCT/JP2008/068821
§ 371 (c)(1), (2), (4) Date: Apr. 22, 2010

(87) PCT Pub. No.: WO2009/054317
PCT Pub. Date: Apr. 30, 2009

(65) Prior Publication Data
US 2010/0244480 A1  Sep. 30, 2010

(30) Foreign Application Priority Data

Oct. 23, 2007 (JP) .................................. 2007-275510

(51) Int. Cl.
*B60N 2/10* (2006.01)
*B60N 2/50* (2006.01)
(52) U.S. Cl. ............... 296/65.02; 297/325; 297/344.16
(58) Field of Classification Search ............... 296/65.02; 297/325, 344.15, 344.16
See application file for complete search history.

(56) References Cited

U.S. PATENT DOCUMENTS

| | | | |
|---|---|---|---|
| 4,081,051 A | | 3/1978 | Logsdon |
| 4,729,539 A | * | 3/1988 | Nagata ........................ 248/575 |
| 5,676,424 A | * | 10/1997 | Winkelhake .................. 297/337 |
| 5,772,283 A | | 6/1998 | Yoshida et al. |
| 6,340,152 B1 | * | 1/2002 | Ritchie et al. .............. 267/64.12 |

FOREIGN PATENT DOCUMENTS

| | | |
|---|---|---|
| JP | 7223475 A | 8/1995 |
| JP | 3054683 B2 | 6/2000 |
| JP | 2005206028 A | 8/2005 |

OTHER PUBLICATIONS

International Search Report, PCT/JP2008/068821, dated Feb. 3, 2009.

* cited by examiner

*Primary Examiner* — Glenn Dayoan
*Assistant Examiner* — Jason S Daniels
(74) *Attorney, Agent, or Firm* — Renner, Kenner, et al

(57) ABSTRACT

A simplified tilt-integrated suspension mechanism includes first and second supporting legs to support an upper frame and a lower frame on one side of a seat section, and third and fourth supporting legs to support the lower frame and the upper frame on the other side of the seat section. The first and third supporting legs are pivotally connected to the upper frame on the same axial line. The second and fourth supporting legs each include a lower supporting leg portion pivotally connected to the lower frame, and an upper supporting leg portion pivotally connected to the lower supporting leg portion by a pivot pin and slidably joined to the upper frame. A releasable locking means may also be provided.

5 Claims, 9 Drawing Sheets (a)

(b)

(a)

(b)

(a)

(b)

(a)

(b)

TILT-MECHANISM-INTEGRATED SUSPENSION MECHANISM

This application claims the benefit of Japanese Patent Application No. 2007-275510, filed on Oct. 23, 2007, and PCT Patent Application No. PCT/JP2008/068821, which are incorporated herein by reference.

FIELD OF THE INVENTION

This invention relates to a tilt mechanism and a suspension mechanism and, more specifically, a tilt mechanism-integrated suspension mechanism which is simplified in apparatus configuration.

BACKGROUND OF THE INVENTION

A vehicle seat is required to be a comfortable seat which minimizes fatigue of not only a driver, but also occupants who go on a long drive with the driver. Therefore, the material of the seat or a shock absorber is improved, or a reclining system for seat backs is employed.

A tilt-up type vehicle seat which allows the seat section to be tilted adjustably and allows the seat be adapted to physical sizes of an occupant(s) has been proposed (See Japanese Patent No. 3054683).

The tilt mechanism described in Patent Document 1 listed above includes a tilt-up mechanism positioned under a seat cushion, the tilt-up mechanism is assembled basically with an upper frame portion and a lower frame portion connected by a pivot pin at a position on the front side of frames and by link arms which can be extended or opened from their folded positions on the rear side of the frames, whereby a comfortable seat is provided by allowing a rotational adjustment of the seat section according to physical sizes of an occupant(s) is provided.

However, since the tilt mechanism disclosed in Patent Document 1 is the tilt mechanism additionally integrated in a seat frame portion, an angle adjusting mechanism is required in addition to link members for connecting the upper frame portion (upper rail) and the lower frame portion (lower rail), so that the apparatus configuration becomes complicated.

It is an object of the present invention to provide a tilt-mechanism-integrated suspension mechanism which is simplified in apparatus configuration.

SUMMARY OF THE INVENTION

The present invention is intended to solve the above-described problem by integrating a tilt mechanism into a suspension mechanism.

An apparatus of the present invention to achieve the above described object is a tilt-mechanism-integrated suspension mechanism in which a tilt mechanism that adjustably tilt a seat section is incorporated comprising: an upper frame portion on which the seat section is mounted; a lower frame portion mounted on a vehicle floor surface so as to oppose the upper frame portion; first and second supporting legs to support the lower frame portion and the upper frame portion on one side of the seat section; third and fourth supporting legs to support the lower frame portion and the upper frame portion on the other side of the seat section, and a shock absorbing means for absorbing the shock from the seat section.

One end of the first supporting leg and one end of the third supporting leg are pivotally connected to the upper frame portion on the same axial line, respectively, the second and fourth supporting legs each includes a lower supporting leg portion of which one end is pivotally connected to the lower frame portion, an upper supporting leg portion of which one end is pivotally connected to the other end of the lower supporting leg portion and of which the other end of the upper supporting leg portion is engaged with the upper frame portion so as to be able to make a sliding movement, a locking means for locking the upper supporting leg portion to the lower supporting leg portion, a lock-state maintaining means for maintaining the lock between the upper supporting leg portion and the lower supporting leg portion by resiliency, and a releasing means for releasing the lock against the resiliency force of the lock-state maintaining means.

Since the one end of each of the upper supporting leg portions is pivotally connected to the other end of each of the lower supporting leg portions, the other end of each of the upper supporting leg portions is engaged with the upper frame portion so as to be able to make a sliding movement, and the one end of each of the first and third supporting legs are pivotably connected by the upper frame portion, if the lock is released, the upper supporting leg portions are able to be rotated and tilted about the ends of the first and third supporting legs which are pivotally connected to the upper frame portion so that the seat section is tiled.

If the release operation by the releasing means is stopped, the upper supporting leg portions are re-locked to the lower supporting leg portions by the resiliency of the lock-state maintaining means. Therefore, the rotation of the upper supporting leg portions can be stopped at a predetermined position. Accordingly, the tilt mechanism can tilt adjustably the seat section.

An apparatus of the present invention is a tilt-mechanism-integrated suspension mechanism in which a tilt mechanism that adjustably tilt a seat section is incorporated comprising: an upper frame portion on which the seat section is mounted; a lower frame portion mounted on a vehicle floor surface so as to oppose the upper frame portion; first and second supporting legs to support the lower frame portion and the upper frame portion on one side of the seat section; third and fourth supporting legs to support the lower frame portion and the upper frame portion on the other side of the seat section, and a shock absorbing means for absorbing the shock from the seat section.

One end of the first supporting leg and one end of the third supporting leg are pivotally connected to the upper frame portion on the same axial line, respectively, the second and fourth supporting legs each includes a lower supporting leg portion of which one end is pivotally connected to the lower frame portion, and an upper supporting leg portion of which one end is pivotally connected to the other end of the lower supporting leg, the other end of the upper supporting leg portion being engaged with the upper frame portion so as to be able to make a sliding movement.

The second supporting leg further includes a locking means for locking the upper supporting leg portion of the second supporting leg to the lower supporting leg portion of the second supporting leg, a lock-state maintaining means for maintaining the lock between the upper supporting leg portion and the lower supporting leg portion by resiliency, and a releasing means for releasing the lock against the resiliency force of the lock-state maintaining means.

In this manner, the locking means, the locked-state maintaining means, and the releasing means can be provided only on the second supporting leg. It is because the fourth supporting leg follows the rotation of the second supporting leg. The second and fourth supporting legs may be provided either on the door side or the inside of the vehicle.

The locked-state maintaining means may include a rotating member rotatably supported on the lower frame portion by a pivot pin and a resilient member for holding the rotating member at a predetermined position. The lock is maintained, when the rotating member is at the predetermined position. The lock is released, when the rotating member is rotated from the predetermined position by the releasing means against the resiliency of the resilient member. It is because the action can be smoothened by performing the lock and releasing thereof by the rotation of the rotating member.

Furthermore, the second supporting leg may be pivotally connected to the first supporting leg by a pivot pin so as to intersect with each other, and the fourth supporting leg may be pivotally connected to the third supporting leg by a pivot pin so as to intersect with each other. The first and second supporting legs may support the upper frame portion and the lower frame portion independently from each other and the third and fourth supporting legs may support the upper frame portion and the lower frame portion independently from each other.

ADVANTAGES OF THE INVENTION

According to the present invention, since the supporting legs of the suspension are composed of the upper and lower supporting leg portions tow portions, the upper frame portion can be tilted by the rotation of the upper supporting leg portions and the rotation can be stopped by locking the upper supporting portion to the lower supporting portion and can be continued by releasing the lock. Therefore, a vehicle seat having the tilt-mechanism-integrated suspension mechanism which is simplified in apparatus configuration is provided.

BRIEF DESCRIPTION OF THE DRAWINGS

FIG. 5(a) shows the mechanism that the front (left) side of the upper frame is moved upward, and FIG. 5(b) shows the mechanism that front (left) side of the upper frame is moved downward.

FIGS. 7(a) and (b) show a tilt-mechanism-integrated suspension mechanism according to another embodiment of the present invention, FIG. 7(a) shows a locked state, and Fig. (b) shows a state in which the lock is released.

DETAILED DESCRIPTION OF THE PREFERRED EMBODIMENT

Figure 1:
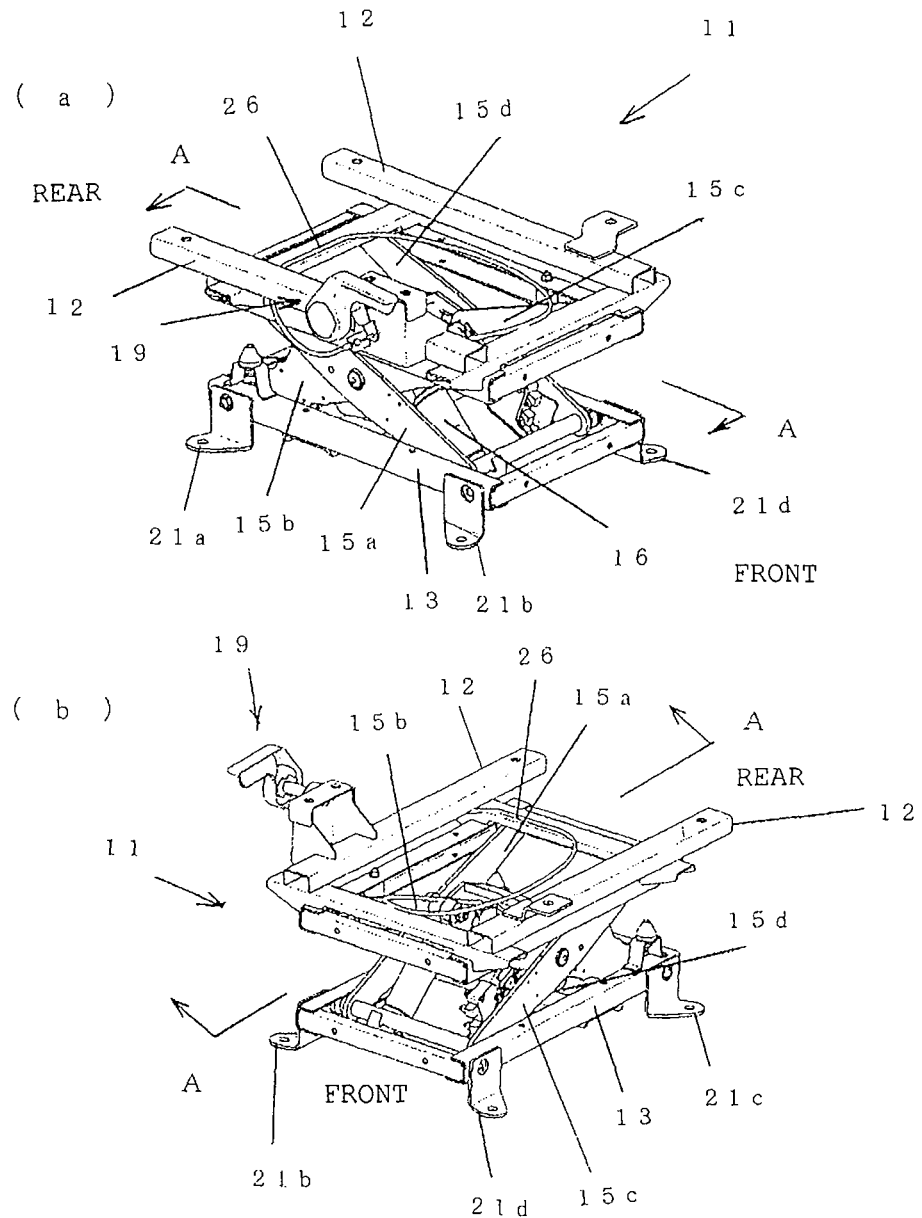
FIG. 1(a) is a perspective view of an internal structure of a tilt-mechanism-integrated suspension mechanism according to the present invention viewed from the side of a tilt lever.
FIG. 1(b) is a perspective view of the internal structure of the same viewed from the opposite side from the tilt lever.

Referring now to the drawings, preferred embodiments of the present invention are described.

As shown in FIGS. 1(a) and 1(b), a tilt-mechanism-integrated suspension mechanism 11 includes upper frames 12 on which a seat section of a seat is placed and lower frames 13 which are placed on a floor surface of a vehicle, a first supporting leg 15a, a second supporting leg 15b, a third supporting leg 15c, and a fourth supporting leg 15d for supporting the upper frame 12 and the lower frame 13, a shock absorber 16 as a shock absorbing means, a locking mechanism 17 as a locking means (shown in other drawings), a spring member 18 as a locked-state maintaining means (shown in other drawings), and a tilt lever 19 as a releasing means.

The upper frames 12 are two opposed beam members provided in the fore-and-aft direction of the tilt-mechanism-integrated suspension mechanism 11 and the beam members are connected to two opposed small beam and the four members form a generally rectangular frame member.

The lower frames 13 and opposed beam members connected to the lower frames also form a rectangular frame member in the same manner as the upper frame 12, and are attached to the floor surface of the vehicle with L-shaped fixtures 21a, 21b, 21c, 21d provided respectively at four corners.

The upper frames 12 and the lower frames 13 are supported by the first supporting leg 15a and the second supporting leg 15b intersecting in X-shape on one side surface, and by the third supporting leg 15c and the fourth supporting leg 15d intersecting also in X-shape on the other side surface. The both side surfaces of the tilt-mechanism-integrated suspension mechanism 11 are supported respectively by the supporting legs 15a, 15b and 15c, 15d. An internal structure of the tilt-mechanism-integrated suspension mechanism 11 will be descried on the basis of an enlarged view separately.

Figure 2:
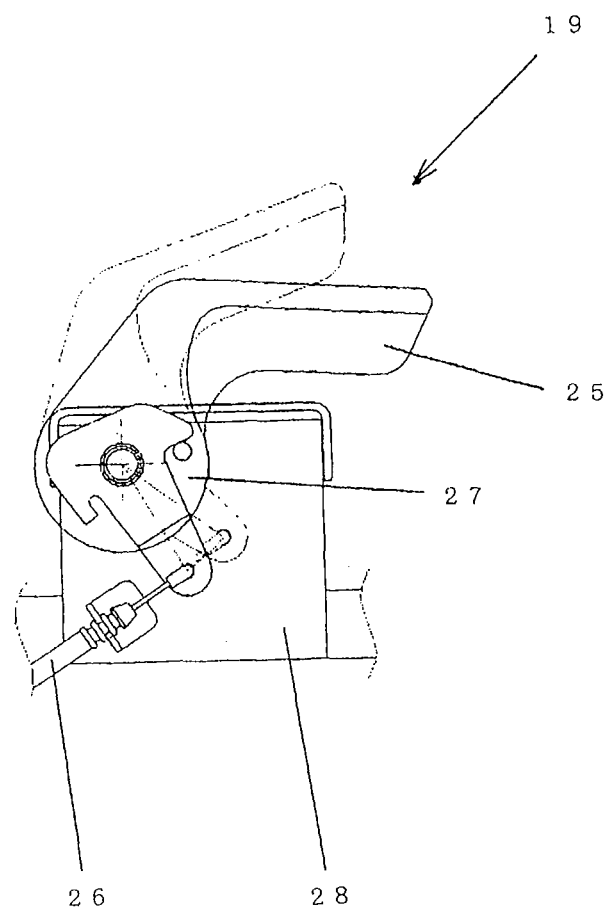
FIG. 2 is a front view of a tilt lever 19 as a releasing means.

FIG. 2 is a front view of the tilt lever 19 as a releasing means. As shown in FIG. 2, the tilt lever 19 includes a substantially L-shaped lever member 25 mainly for allowing an occupant to do a tilting operation, a lever link member 27 which rotates with the operation of the lever member so as to pull a wire 26, and a mounting member 28 on which the lever link member 27 is pivotally mounted by a pivot pin. The mounting member 28 is mounted on one of the sides of the upper frame 12.

One end of the wire 26 is connected to the lever link member 27, and the other end is connected to a portion of the locking mechanism 17 (shown in other drawings).

Figure 3:
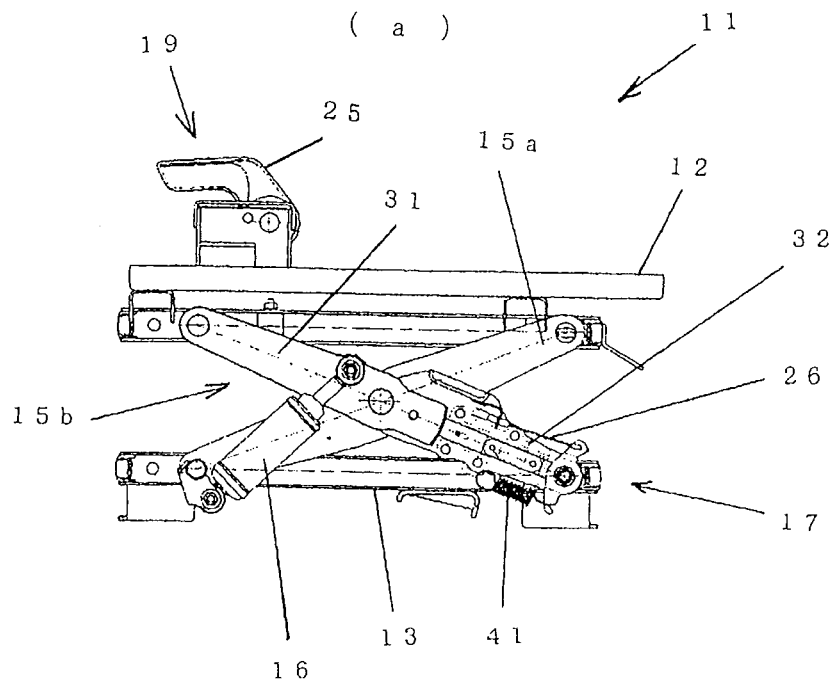
FIG. 3(a) is a front view of the tilt-mechanism-integrated suspension mechanism viewed in the direction indicated by an arrow A-A in FIGS. 1(a) and 1(b)
FIG. 3(b) is a partial enlarged view of the same.
Figure 3:
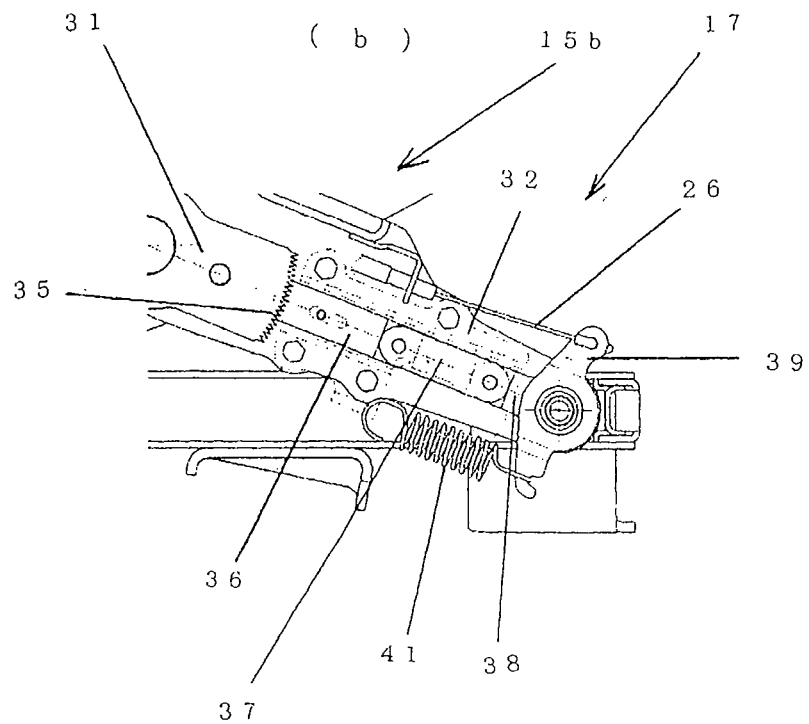

FIG. 3(a) is a front view of the suspension mechanism viewed in the direction indicated by an arrow A-A in FIGS. 1(a) and 1(b), and FIG. 3(b) is a partial enlarged view of the same.

As shown in FIG. 3(a), the supporting legs 15a and 15b intersect in X-shape, and both ends thereof are connected to the upper frame 12 and the lower frame 13 for supporting the same. The upper end of the supporting leg 15a is pivotally connected to the upper frame 12 by a pivot pin, and the lower end of the supporting leg 15a is pivotally connected to the lower frame 13 by a pivot pin.

The supporting leg 15b is composed of an upper portion 31 and a lower portion 32, and one end of the lower portion 32 is pivotally connected to the supporting leg 15a via a pivot pin at an intersecting point with the supporting leg 15a. The other end of the lower portion 32 is pivotally connected to the lower frame 13 via a pivot pin joint. One end of the upper portion is overlapped with the lower portion 32 at the intersecting point with the supporting leg 15a and is also pivotally connected to the other end of the lower portion by the pivot pin. The other end of the upper portion 31 is joined to the upper frame 12 so as to be capable of moving via a roller to achieve a movement along the upper frame 12.

As shown in FIG. 3(b), the upper portion 31 and the lower portion 32 are each formed to have a sawtooth appearance, and are joined with each other via arcuate members which engage with each other. A toothed portion 35 having the sawtooth appearance is formed on the upper portion 31 side, and the lower portion 32 is provided with a toothed member 36 having the sawtooth appearance attached thereon, and these toothed members engage with each other.

The toothed member 36 is slidably mounted in a sliding groove formed in the lower portion 32. An elongated hole is formed in the siding groove. A pin secured to the lower portion 32 extends in the elongated hole so that the tooth member is slidable in the groove. The toothed member 36 is engaged on a link member 37 on the side opposite from the side having the sawtooth appearance, and the link member 37 aligns linearly with the toothed member so as to prevent the sliding movement of the toothed member 36.

The link member 37 is a rectangular plate member chamfered at four corners. One end of the link member is pivotally connected to the toothed member by a pivot pin.

The other end of the link member is pivotally connected to a protruding portion 38 of a rotary member being formed into a boomerang shape 39 by a pivot pin.

The boomerang-shaped rotary member 39 is pivotally connected to the lower portion 32 of the supporting leg 15b by the pivot pin which connects the supporting leg 15b to the lower frame 13 so as to rotate about the substantially center of the rotary member. One end of a resilient member 41 as a coil spring is attached to one end of the rotary member 39 and the wire 26 of the tilt lever 19 is attached to the other end of the rotary member 39. Also, the other end of the resilient member 41 is attached to the lower frame 13, and at this time, the resilient member 41 is in a natural state of not urging a resilient force. The resilient member 41 is not limited to a coil spring, and may be other types of resilient member such as a helical spring and leaf spring or, alternatively, a member formed of a resilient material such as rubber may be employed as long as it applies the resilient force.

The toothed portion 35, the toothed member 36, the link member 37, the protruding portion 38, and the rotary member 39 constitute the locking mechanism 17 as the locking means.

The coil spring member 41 functions as a locked-state maintaining means and the tilt lever 19 including the lever member 25, the lever link member 27, the mounting member 28, and the wire 26 function as a releasing means.

Figure 4:
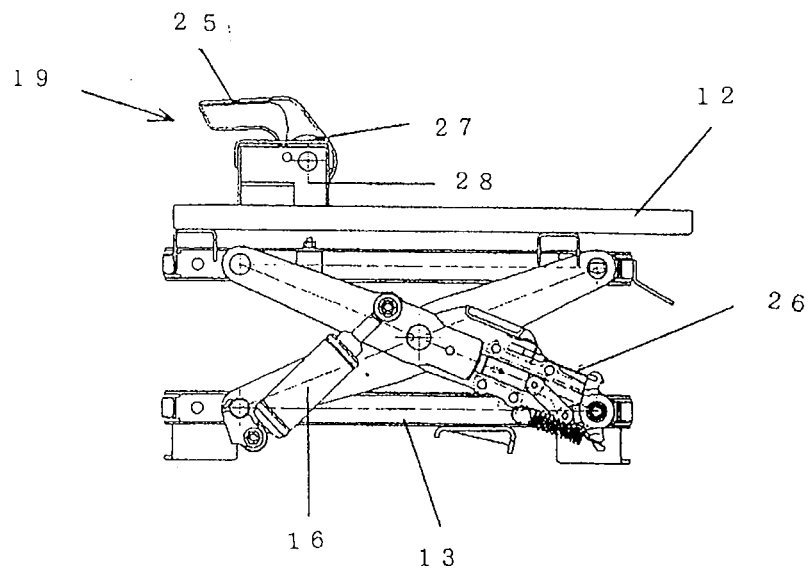
FIG. 4(a) is a front view of a state in which a locking mechanism 17 is released in FIG. 3(a)
FIG. 4(b) is a partially enlarged view thereof.
Figure 4:
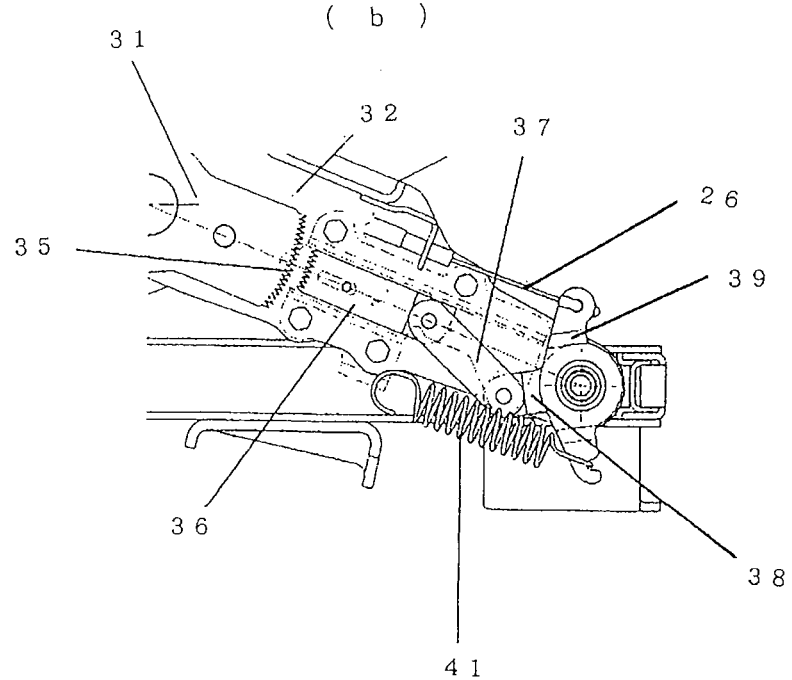

Subsequently, a procedure to release the locking mechanism 17 by the operation of the tilt lever 19 will be described. FIG. 4(a) is a front view of the tilt-mechanism when the locking mechanism 17 is released as shown in FIG. 3(a), and FIG. 4(b) is a partially enlarged view thereof.

As shown in FIG. 4(a), when the lever member 25 of the tilt lever 19 is pulled, the wire 26 attached to the lever link member 27 is pulled, so that the locking mechanism 17 is released. As shown in FIG. 4(b), when the wire 26 is pulled, the rotary member 39 rotates about the center of rotation as an axis. The rotary member 39 rotates against the resilient force of the coil spring member 41 connected to the opposite side of the rotary member 39. When a force to pull the lever member 25 is weakened, the rotary member returns to the original position by the resilient force of the coil spring member.

When the rotary member 39 rotates by being pulled by the wire 26, the protruding portion 38 rotates counterclockwise and the link member 37 connected to the protruding portion is pulled downward, so that the toothed member 36 connected to the link member is moved along the sliding groove. Accordingly, the toothed member 36 backs away from the toothed portion 35 and the engagement between them is released.

Then, since the one end of the upper portion 31 is slidably joined to the upper frame 12 and the other end is pivotally connected to lower portion 32 by the pivot pin, the upper portion 31 can rotate about the pivot pin.

Figure 5:
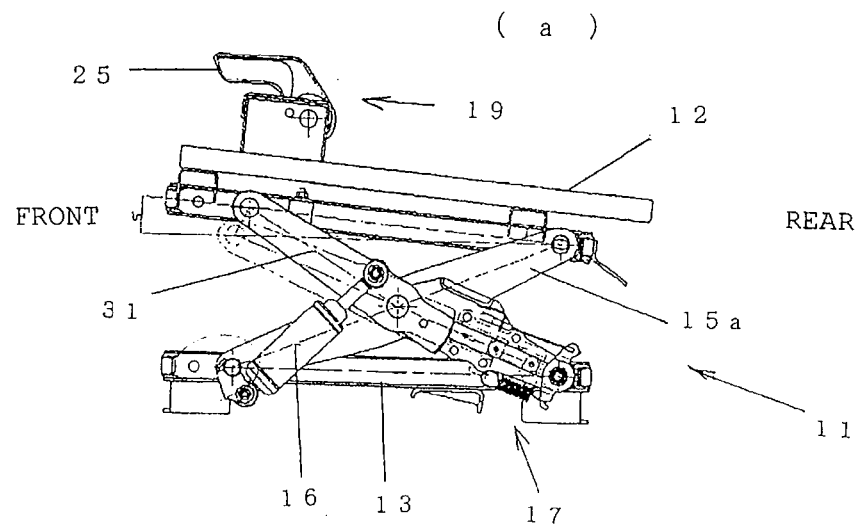
FIGS. 5(a) and 5(b) show the tilt-mechanism-integrated suspension mechanism 11 that the upper frame is tilted (the left side is the front side, and the right side is the rear side).
Figure 5:
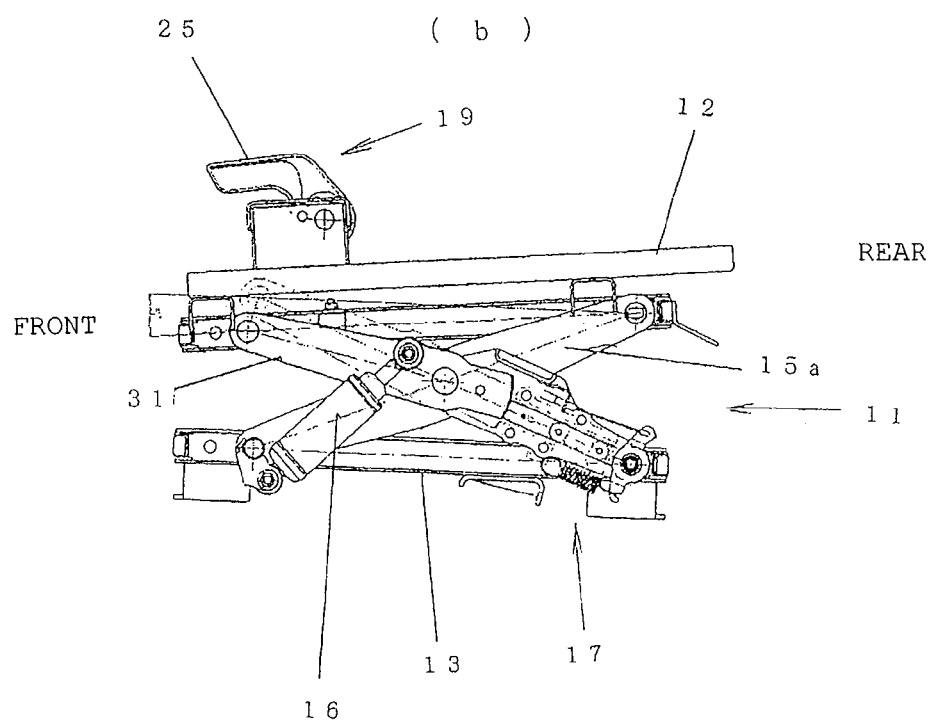

FIGS. 5(a) and 5(b) show the tilt-mechanism-integrated suspension mechanism 11 that the upper frame is tilted (the left side is the front side, and the right side is the rear side). FIG. 5(a) shows the mechanism that the front (left) side of the upper frame is moved upward, and FIG. 5(b) shows the mechanism that front (left) side of the upper frame is moved downward.

As described with reference to FIGS. 4(a) and 4(b), if the engagement between the toothed member 36 and the toothed portion 35 is released, the upper portion 31 rotates about the pivot pin by which the upper portion is connected to the lower portion 32 and the one end of the upper portion 31 is moved along the upper frame 12. As a result, the upper frame 12 is tilted so that the seat section on the upper frame 12 is tilted.

At this time, by the action of the shock absorber 16, the gentle tilt is achieved and hence a safe tilt mechanism is obtained. The shock absorber 16 may be those which are commercially available and in which gas is encapsulated as a cushion. Although the shock absorber 16 is attached in between the upper portion 31 of the supporting leg 15b and the lower frame 13, it may be attached to a different position, if the gentle tilt of the upper frame 12 is maintained.

When the pulling of the lever member 25 of the tilt lever 19 is stopped, the rotary member 39 is rotated to its original position by the resiliency of the coil spring member 41, and the toothed member is re-engaged to the toothed portion as shown in FIG. 3(b). Therefore, the seat section can be tilted to a predetermined angular position.

Figure 6:
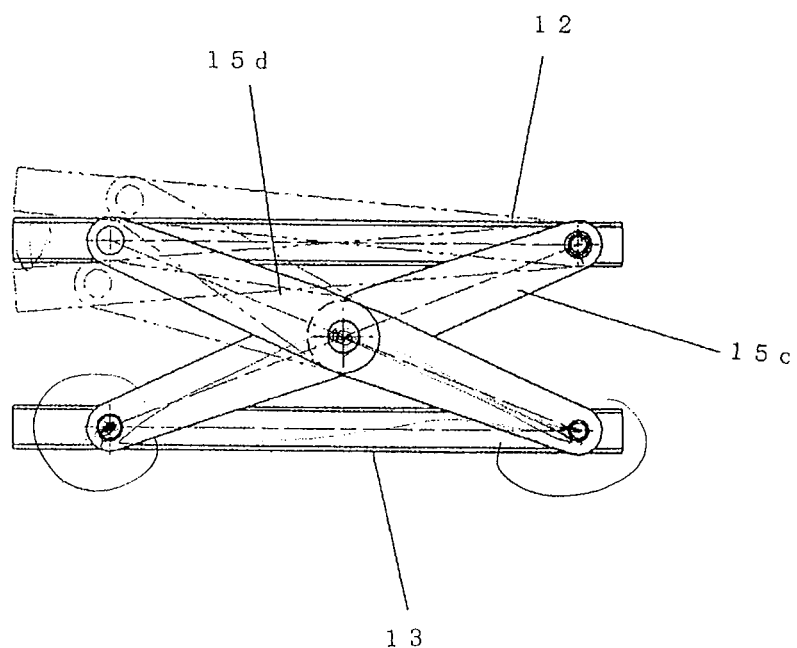

FIG. 6 is a rear view of the structure viewed from the side of supporting legs 15c, 15d. Although the supporting leg 15d is composed of an upper portion and a lower portion in the same manner as the supporting leg 15b, the supporting legs 15c, 15d may be both a single rod shape.

The supporting legs 15c, 15d intersect in the X-shape, and the supporting leg 15d is pivotally connected to the supporting leg 15c. One end of the supporting leg 15c is pivotally connected to the lower frame 13 by a pivot pin and the other end is pivotally connected to the upper frame 12 by a pivot pin. An end of the lower portion of the supporting leg 15d is pivotably connected to the lower frame 13 by a pivot pin, and an end of the upper portion is joined to the upper frame 12 so as to be capable of moving via a roller to achieve a movement along the upper frame. Accordingly, since they are able to follow the action of the supporting legs 15a, 15b, the upper frame 12 is tilted, so that the tilt of the seat section is enabled.

FIGS. 7(a) and (b) show a tilt-mechanism-integrated suspension mechanism according to another embodiment of the present invention, FIG. 7(a) shows a locked state, and Fig. (b) shows a state in which the lock is released.

Description of the same parts as the embodiment described above is omitted, and different parts will be described.

As shown in FIG. 7(a), one end of a rotating member 52 is connected to the other end of the wire 26 as in the embodiment described above, the other end has an elongated hole from which a pin extending from the toothed member 36 protrudes. The toothed member 56 is engaged with the toothed portion 35 of the upper portion 31 (locked state) and, in addition, one end of a coil spring member 51 is attached to the toothed member 36, and the other end of the coil spring member is attached to the upper portion 31 at a position where the supporting legs 15a, 15b intersect. At this time, the coil spring member 51 is in the natural state in which the resilient force does not act.

As shown in FIG. 7(b), when the lever member 25 is pulled and the wire 26 is pulled, the rotating member 52 rotates. By rotation of the rotating member, the pin extending from the toothed member 36 that protrudes from the elongate hole moves the toothed member 36 in the sliding groove against the resiliency force of the coil spring member 51, so that the toothed member is separated from the upper portion, and the engagement between the toothed member and the upper portion is released. Accordingly, the upper portion can rotate as in the embodiment described above, and the upper frame 12 is tilted. When the wire 26 is not pulled, the toothed member 36 and the toothed portion 35 of the upper portion 31 engage with each other by the resilient force of the coil spring member 51, so that the rotation of the upper frame 12 is stopped (locked state).

Figure 7:
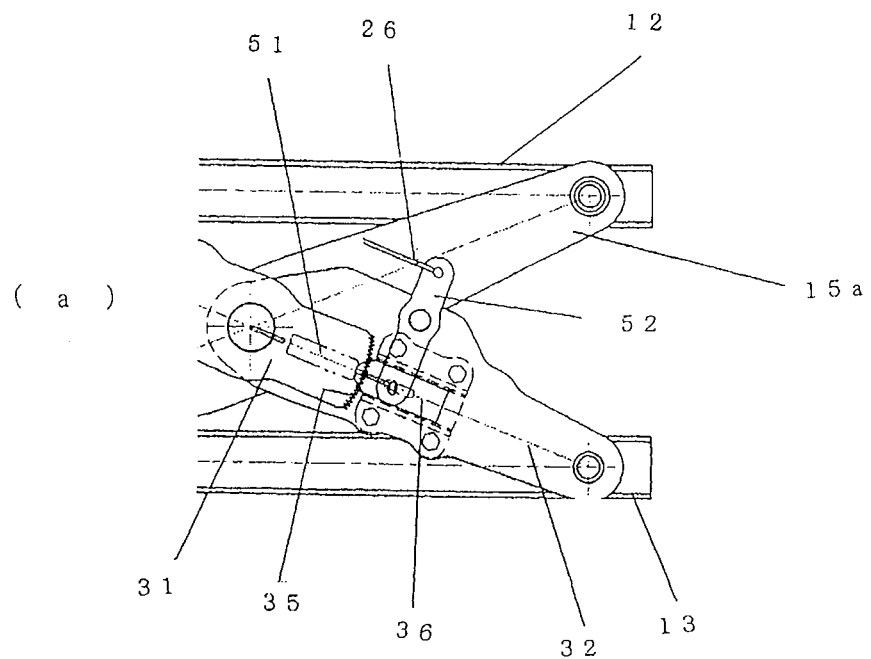
FIG. 7 is a front view showing the structure on the side of supporting legs 15c, 15d.
Figure 7:
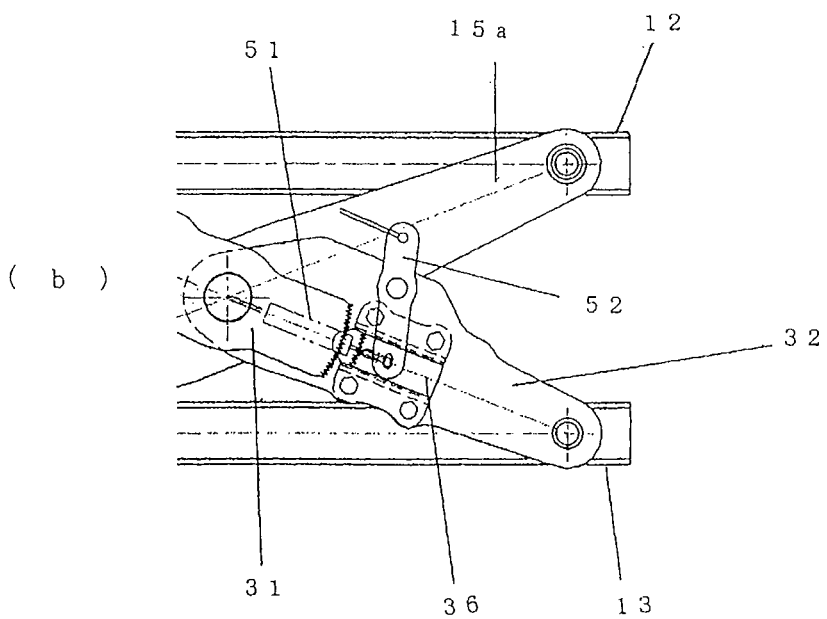
Figure 8:
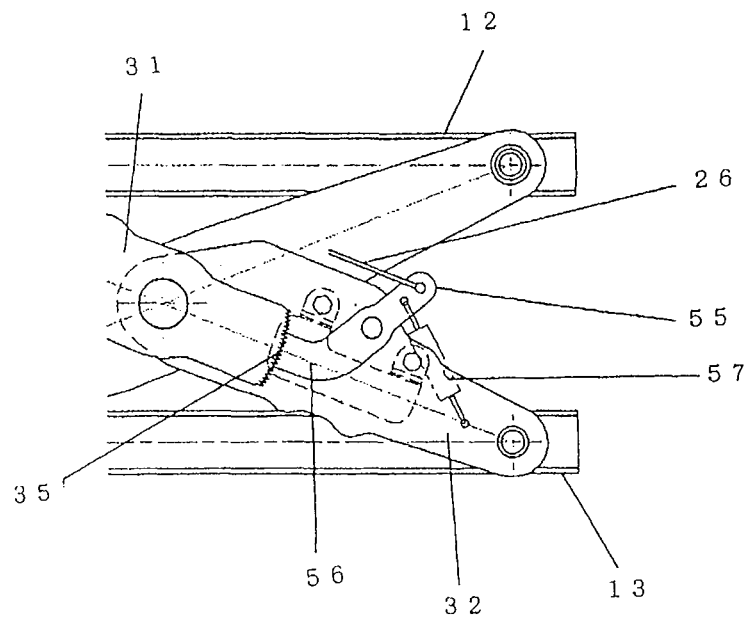
FIGS. 8(a) and (b) shows a tilt-mechanism-integrated suspension mechanism according to a still another embodiment of the present invention, in which FIG. 8 (a) shows the locked state, and FIG. 8 (b) shows a state in which the lock is released.
Figure 8:
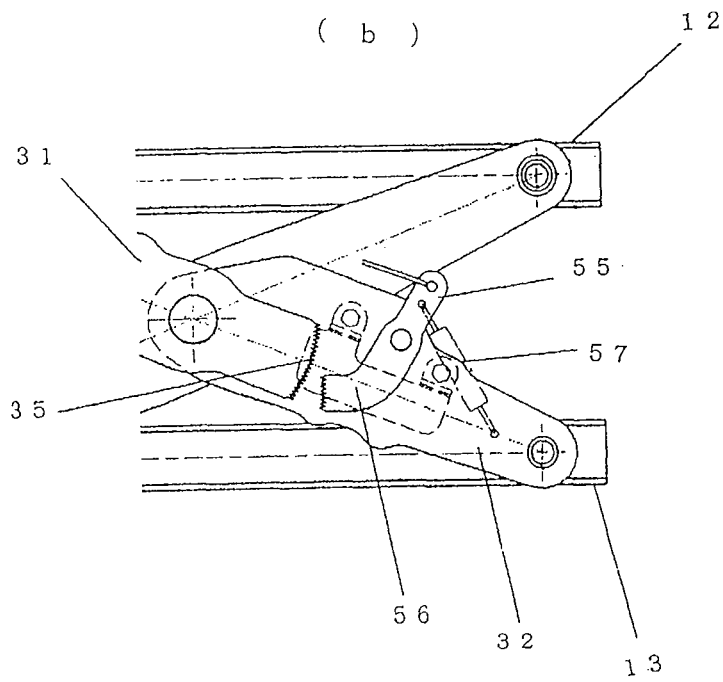

FIGS. 8(a) and (b) shows a tilt-mechanism-integrated suspension mechanism according to a still another embodiment of the present invention, in which FIG. 8 (a) shows the locked state, and FIG. 8 (b) shows a state in which the lock is released. A point different from the embodiments of FIG. 7 is that a rotating member 55 is bent, and one end of the rotating member is a toothed member 56 and the other end is a wire attaching portion to which the other end of wire 26 is attached.

One end of a coil spring member 57 is attached to the wire attaching portion. The other end of the coil spring member 57 is attached to the lower portion 32.

In the locked state shown in FIG. 8(a), the coil spring member 57 is in the natural state, and when the wire 26 is pulled at this time, the rotating member 55 rotates about the rotatably supported point and the engagement between the toothed member 56 and the toothed portion 35 are separated, so that the locked state is released.

FIG. 8(b) shows the tilt-mechanism-integrated suspension mechanism that the locked state is released. In the unlocked state, the upper frame portion can be rotated. The one end of the rotating member 55 at this time is pulled by the resilient force of the coil spring member 57 so that the rotating member returns to the original position of the locked state. Therefore, when the force to pull the wire 26 is released, the toothed member 56 is engaged with the toothed portion 35 by the resilient force as described above, and hence the tilting angle of the upper frame 12 is adjustable.

Figure 9:
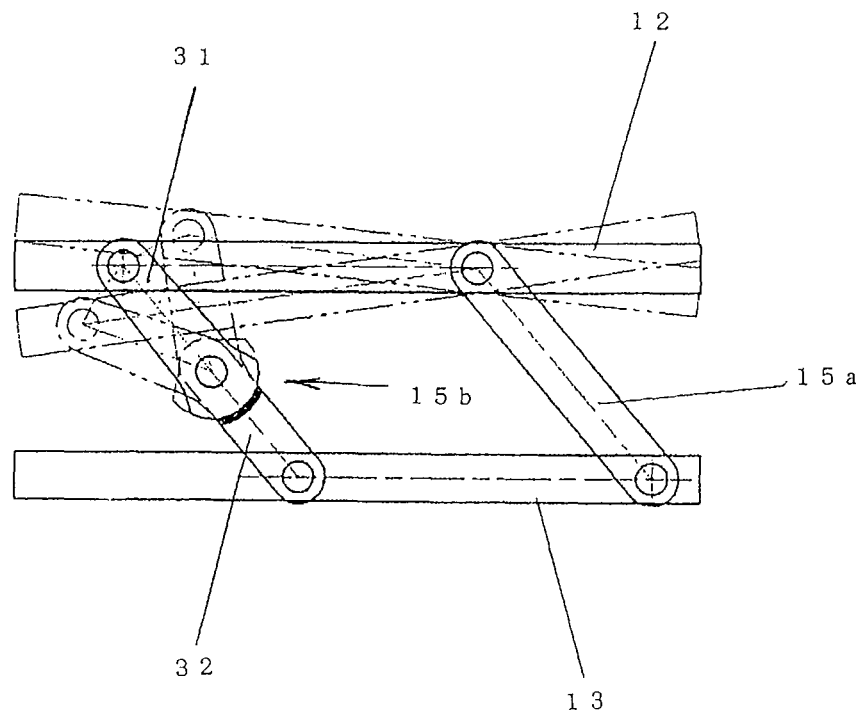
FIG. 9 is a front view of a tilt-mechanism-integrated suspension mechanism that the supporting legs 15a, 15b are arranged according to another embodiment.

FIG. 9 is a front view of a tilt-mechanism-integrated suspension mechanism that the supporting legs 15a, 15b are arranged according to another embodiment. Although the supporting legs 15a, 15b in the embodiment described above intersect in the x-shape, in the embodiment of FIG. 9, the supporting legs 15a, 15b are arranged substantially in parallel to each other and support the upper frame 12 and the lower frame 13. Other configurations are the same as those in the embodiment described above (in FIG. 9, the wire 26, the shock absorber 16, and the locking mechanism 17 are omitted from the drawing).

Even when the supporting legs 15a, 15b are arranged in parallel in this manner, since the supporting leg 15b is composed of the upper portion 31 and the lower portion 32, the upper frame 12 can be rotated by the rotation of the upper portion 31.

As described in detail, according to the tilt-mechanism-integrated suspension of the present invention that the supporting leg is composed of the upper portion and lower portion and the upper portion can be rotated so as to tilt the upper frame, integration of the tilt mechanism into the suspension mechanism is achieved.

What is claimed is:

1. A tilt-mechanism-integrated suspension mechanism in which a tilt mechanism that adjustably tilts a seat section is incorporated consisting of: an upper frame portion on which the seat section is mounted; a lower frame portion mounted on a vehicle floor surface so as to oppose the upper frame portion; first and second supporting legs to support the lower frame portion and the upper frame portion on one side of the seat section; third and fourth supporting legs to support the lower frame portion and the upper frame portion on the other side of the seat section, and a shock absorbing means for absorbing the shock from the seat section, wherein one end of the first supporting leg and one end of the third supporting leg are pivotally connected to the upper frame portion on the same axial line, respectively, the other end of the first supporting leg and the other end of the third supporting leg are pivotally connected to the lower frame portion on the same axial line, respectively, the second and fourth supporting legs each includes a lower supporting leg portion of which one end is pivotally connected to the lower frame portion, an upper supporting leg portion of which one end is pivotally connected to the other end of the lower supporting leg portion and of which the other end of the upper supporting leg portion is engaged with the upper frame portion so as to be able to make a sliding movement, the second supporting leg further including a locking means for locking the upper supporting leg portion of the second supporting leg to the lower supporting leg portion of the second supporting leg, a lock-state maintaining means for maintaining the lock between the upper supporting leg portion of the second supporting leg and the lower supporting leg portion of the second supporting leg by resiliency, and a releasing means for releasing the lock against the resiliency force of the lock-state maintaining means, wherein the second supporting leg is pivotally connected to the first supporting leg by a pivot pin so that they intersect with each other, and the fourth supporting leg is pivotally connected to the third supporting leg by a pivot so that they intersect with each other.

2. The tilt-mechanism-integrated suspension mechanism in accordance with claim 1, wherein the locked-state maintaining means includes a rotating member rotatably supported on the lower frame portion by a pivot pin and a resilient member for holding the rotating member at a predetermined position, the lock is maintained when the rotating member is at a predetermined position, the lock is released, when the rotating member is rotated from the predetermined position by the releasing means against the resiliency of the resilient member.

3. A tilt-mechanism-integrated suspension mechanism in accordance with claim 1, wherein the other end of the lower supporting leg portion of the second supporting leg is pivotally connected to the first supporting leg by a pivot pin so that they intersect with each other.

4. A tilt-mechanism-integrated suspension mechanism in which a tilt mechanism that adjustably tilts a seat section is incorporated comprising: an upper frame portion on which the seat section is mounted; a lower frame portion mounted on a vehicle floor surface so as to oppose the upper frame portion; first and second supporting legs to support the lower frame portion and the upper frame portion on one side of the seat section; third and fourth supporting legs to support the lower frame portion and the upper frame portion on the other side of the seat section, and a shock absorbing means for absorbing the shock from the seat section, wherein one end of the first supporting leg and one end of the third supporting leg are pivotally connected to the upper frame portion on the same axial line, respectively, the other end of the first supporting leg and the other end of the third supporting leg are pivotally connected to the lower frame portion on the same axial line, respectively, the second and fourth supporting legs each includes a lower supporting leg portion of which one end is pivotally connected to the lower frame portion, an upper supporting leg portion of which one end is pivotally connected to the other end of the lower supporting leg portion and of which the other end of the upper supporting leg portion is engaged with the upper frame portion so as to be able to make a sliding movement, at least one of the second and the fourth supporting legs further including a locking means for locking the upper supporting leg portion to the lower supporting leg portion, a lock-state maintaining means for maintaining the lock between the upper supporting leg portion and the lower supporting leg portion by resiliency, and a releasing means for releasing the lock against the resiliency force of the lock-state maintaining means, wherein the first and the second supporting legs are arranged substantially in parallel to each other and each supports the upper frame portion and the lower frame portion, and the third and fourth supporting legs are arranged substantially in parallel to each other and each supports the upper frame portion and the lower frame portion.

5. The tilt-mechanism-integrated suspension mechanism in accordance with claim 4, wherein the locked state maintaining means includes a rotating member rotatably supported on the lower frame portion by a pivot pin and a resilient member for holding the rotating member at a predetermined position, the lock is maintained when the rotating member is at a predetermined position, the lock is released when the rotating member is rotated from the predetermined position by the releasing means against the resiliency of the resilient member.

* * * * *